United States Patent Office.

W. T. BUSH, OF UNION CITY, TENNESSEE.

*Letters Patent No.* 94,073, *dated August* 24, 1869; *reissue No.* 3,668, *dated October* 12, 1869.

IMPROVEMENT IN THE MANUFACTURE OF SOAP.

The Schedule referred to in these Letters Patent and making part of the same

*To all to whom these presents shall come:*

Be it known that I, W. T. BUSH, a citizen of Union City, Obion county, and State of Tennessee, have invented a new and improved Labor-Saving Soap; and I do hereby declare that the following is a clear, full, and exact description of the composition and manufacture of the same.

The nature of my invention consists in the preparation of a washing-soap, which will the more readily remove the dirt from soiled clothes and other articles, and avoid the necessity of beating and rubbing them, which are necessarily injurious and destructive to the articles to be cleansed.

I am aware that a great variety of soaps has been made, having for their object a similar purpose to mine, but after a long experience in the manufacture of soaps, and after long, laborious, and expensive experiments with the various combinations of ingredients and modes of manufacture, I am satisfied that my new soap is far superior to any ever yet made.

To enable others skilled in the art to manufacture my new soap, I will proceed to describe its composition, and the mode in which I make it.

Put into a kettle three and a half ($3\frac{1}{2}$) gallons of soft water, one and a half ($1\frac{1}{2}$) pound of soda-ash, and one and a half ($1\frac{1}{2}$) pound of unslaked lime. Boil these ingredients thirty minutes, and pour off into another vessel, to allow the mixture to settle. Next pour back the clear liquid into the kettle, and add three and a half ($3\frac{1}{2}$) pounds of common soap-grease. Boil this for two hours, and then add one gallon of cold water. Again boil until the mixture is as low in the kettle as before adding the cold water. Then add one pound of sal-soda, one-quarter of a pound of borax, and six gallons of cold water, after which boil and stir for ten minutes, and set off the vessel to cool. Next add one and a half ounce of clear spirits of turpentine, and one and a half ounce of liquid ammonia.

The soap is then complete and ready for use, the quantity of ingredients above named making nearly fifty pounds of superior labor-saving soap.

By omitting the six gallons of water, I make a bar-soap, possessing all the properties of the labor-saving soap.

What I claim as my invention, and desire to secure by Letters Patent, is—

The combination of the said ingredients, when the same are manufactured into soap, substantially as set forth.

W. T. BUSH.

Witnesses:
R. B. DAVIS,
JOHN H. DAVIS.